Patented June 23, 1925.

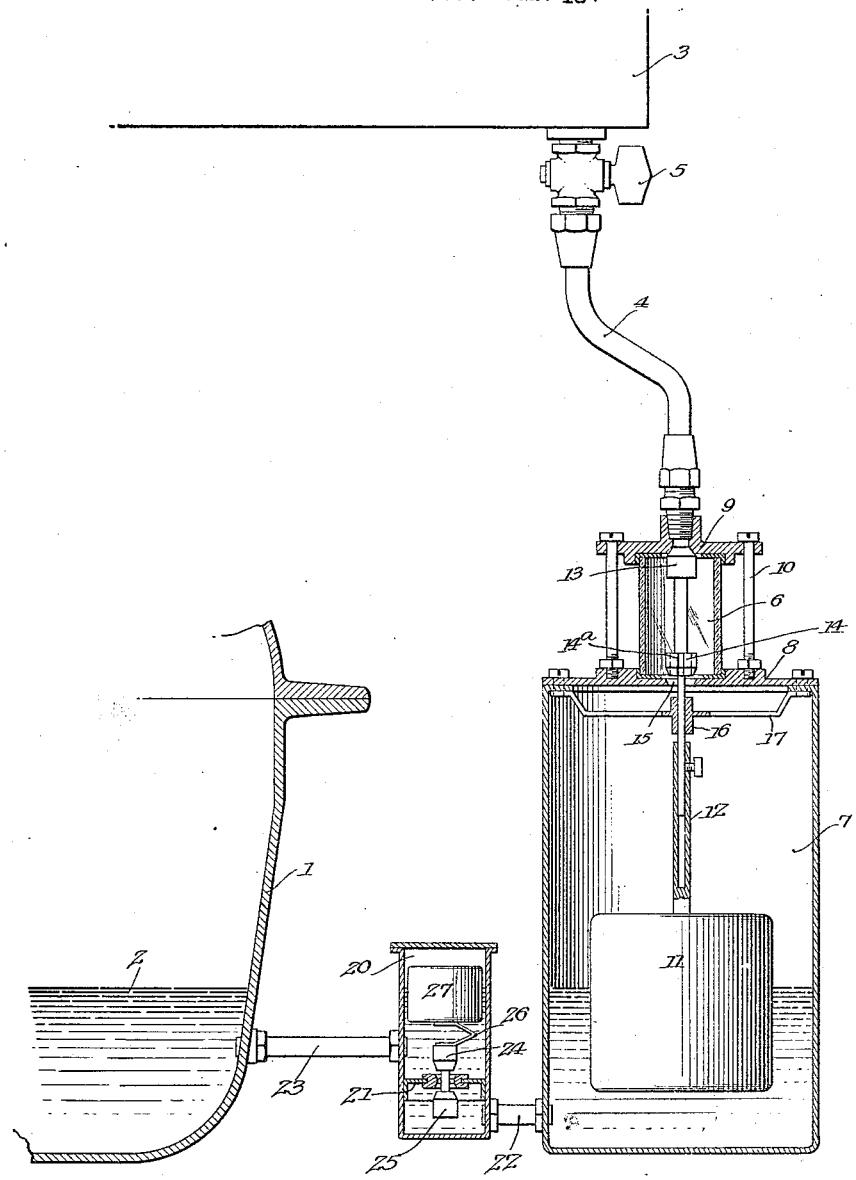

1,542,912

UNITED STATES PATENT OFFICE.

CHARLES ROCKWELL, OF NEWCASTLE, WYOMING.

MOTOR-VEHICLE-ENGINE LUBRICATING SYSTEM.

Application filed January 18, 1924. Serial No. 687,039.

*To all whom it may concern:*

Be it known that I, CHARLES ROCKWELL, a citizen of the United States, residing at Newcastle, in the county of Weston and State of Wyoming, have invented new and useful Improvements in Motor-Vehicle-Engine Lubricating Systems, of which the following is a specification.

The present invention relates to improvements in systems for controlling the supply of lubricant to the crank case of an automobile engine.

Among the objects of the invention are to provide a simple and automotically acting means for maintaining a substantially constant quantity of lubricating oil in the crank case of an automobile engine. A further object is to provide means whereby the amount of lubricating oil in the crank case of an automobile engine will not be materially affected by such crank case occupying other than a substantially horizontal position.

With many of the systems heretofore proposed for supplying lubricating oil to the crank case of an automobile engine, the quantity of oil in the crank case is materially varied when the vehicle is moving up or down grades so that the crank case occupies an inclined position. To avoid this undesirable feature is one of the principal objects of the present invention.

In the accompanying drawing there is illustrated, more or less conventionally, one embodiment of an oil supply system constructed in accordance with the present invention.

It is to be understood that in the drawing many of the parts are shown more or less conventionally, and that there can be considerable change in the form and proportions of the several elements without departing from the invention.

Referring to the drawings, 1 indicates a portion of the crank case of an automobile engine, and 2 the body of lubricating oil, which is commonly placed in such crank case and into which the cranks dip at each revolution.

3 designates the main lubricant supply tank, which is, as usual, supported by the vehicle in an elevated position relative to the crank case 1, so that the lubricating oil will flow, by gravity, from such tank to the crank case.

The elevated supply tank 3 will, of course, be provided with a suitable inlet as well as means for indicating the amount of oil contained therein at any time, which features are not shown; and a main pipe 4 leads from a suitable outlet provided in the bottom of the tank.

The outlet from the tank 3 may be provided with a suitable net or perforated cover, as usual, for preventing dirt or other solid particles passing from the tank into the pipe. Such devices are common in all automobile lubricant supply systems, and, therefore, are not illustrated.

5 designates a cut-off valve by which the flow of oil from the tank 3 is controlled.

The supply pipe 4 communicates with a chamber 6 provided at the upper end of a main reservoir 7. As shown, the chamber 6 is formed by a glass tube, which has its ends seated in suitable recesses formed in the top plate 8 of the reservoir 7, and in a plate 9, which is securely connected to the plate 8 by bolts 10.

Within the reservoir 7 is arranged a float 11, the stem 12 of which is adjustably connected with a valve stem or rod on the upper end of which is secured a valve 13.

The valve 13 is adapted to cooperate with a suitable seat formed in the lower face of the plate 9 and about the aperture in said plate with which the supply pipe 4 is connected. That is, the valve 13 constitutes an automatically actuated means for controlling the flow of oil from the supply tank to the reservoir 7.

On the valve stem, below the valve 13, is secured a stop 14, the lower end of which is shaped to fit closely within a seat 15 formed in the top plate 8 of the reservoir, when the float 11 sinks to a predetermined level.

As shown, the valve 13 and stop 14 are so related that when the valve 13 is seated, the stop 14 is lifted slightly from its seat, and the stop 14 is of such form that while it positively limits the extent of downward movement of the valve 13, it does not entirely close the passage from the chamber 6 to the reservoir 7, through the seat 15. In the embodiment of the invention illustrated, this is accomplished by providing the stop 14 with a series of peripheral channels or grooves 14ª, extending from the top to the bottom of the stop.

The rod connecting the valve 13 with the float stem 12 extends through a suitable stationary guide 16 that is shown as being secured to and depending from the top plate 8 of the reservoir by arms 17.

Between the reservoir 7 and the crank case 1, there is arranged an auxiliary, smaller, reservoir 20, which is interiorly divided by a partition 21 into two chambers. The lower chamber of the auxiliary reservoir communicates with the main reservoir 7, near the bottom thereof, through a pipe 22, and a pipe 23 connects the upper chamber of the auxiliary reservoir with the crank case 1.

The partition 21 is provided with a centrally located oil passage, the opposite ends of which are formed as valve seats with which, respectively, cooperate valves 24, 25. The upper valve 24 is connected by a V-shaped spring member 26 with a float 27. The connection is such that there may be a slight relative movement between the float 27 and the valve 24.

The parts are so related that normally the oil in the crank case 1 and reservoirs 7 and 20, will stand at the same level, and the passage through the partition 21 will be fully opened while the inlet valve 13 is closed.

As the supply of oil is reduced and should be replenished, the main float 11 will sink, thereby rendering the inlet valve 13 inoperative and permitting additional oil to flow through the chamber 6 into the reservoir 7.

The extent of downward movement of the valve 13 is limited by the stop 14, which will prevent any sudden movement from causing the float 11 to contact with the bottom of the reservoir 7. When the stop 14 is operative, such oil as then flows from the pipe 4 into the chamber 6 will pass through the channels 14$^a$ into the reservoir.

If the vehicle to which the device of the invention is applied causes the engine crank case to assume an inclined position, the consequent tendency of the oil to flow to or from the crank case will effect vertical movement of the float 27 and connected valves which will cooperate with the valve seats in the partition 21 to prevent any substantial part of the oil flowing to or from the crank case. As soon as the parts are restored to a normal, level position, the valves 24 and 25 will both be rendered inoperative so that the desired level of oil in the crank case and main reservoir 7 will be restored and maintained by movement of the float 11 and valve 13.

I claim:

1. The combination with the crank case of an automobile engine, of an elevated supply tank, connections between the tank and crank case including a reservoir adjacent the crank case, a partition extending across the reservoir and having an oil passage formed therethrough, a valve stem extending through said passage, valves on said stem above and below the partition and adapted to, respectively, close the upper and lower ends of said passage, a float in the reservoir above the partition, and a yielding connection between the upper valve and said float.

2. The combination with the crank case of an automobile engine, of means for supplying the crank case with lubricating oil comprising an elevated supply tank, a reservoir connected with the tank and crank case, automatically acting means controlling the flow of oil from the tank to the reservoir to normally maintain a uniform level of oil in the crank case, and float controlled valve means between the reservoir and crank case for checking flow of oil in either direction between the crank case and reservoir when the crank case is in an inclined position.

3. The combination with the crank case of an automobile engine, of means for supplying the crank case with lubricating oil comprising an elevated supply tank, a reservoir connected with the tank and crank case, a float within the reservoir, valve means connected with said float and controlling the supply of oil from the tank to the reservoir, and auxiliary float controlled means between the reservoir and crank case for checking flow of oil in either direction between the crank case and reservoir when the crank case is in an inclined position.

4. The combination with the crank case of an automobile engine, of means for supplying lubricating oil to said crank case comprising an elevated supply tank, a reservoir connected with said tank and the crank case, a float in the reservoir, a valve connected to the float and controlling flow of oil from the tank to the reservoir, a stop for limiting downward movement of the float in the reservoir, and means for automatically checking flow of oil between the reservoir and crank case, in either direction, when the crank case is in an inclined position.

5. The combination with the crank case of an automobile engine, of means for supplying lubricating oil to said crank case comprising an elevated supply tank, a reservoir having an inlet at its top and an outlet, a conduit connecting the reservoir inlet with the supply tank, a float in the reservoir, a valve controlling flow of oil from the tank to the reservoir and having its stem extending through the reservoir inlet and connected to the float, a stop on said valve stem coperating with the reservoir inlet for limiting downward movement of the float without interrupting the supply of oil to the reservoir, a conduit connecting the outlet of the reservoir with the crank case, and automatically acting means for preventing flow of oil between the reservoir and crank case, in either direction, when the crank case is in an inclined position.

6. The combination with the crank case of an automobile engine, of means for supplying lubricating oil to said crank case comprising an elevated supply tank, a reservoir having an inlet at its top and an outlet, a conduit connecting the reservoir inlet with the supply tank, a float in the reservoir, a valve controlling flow of oil from the tank to the reservoir and having its stem extending through the reservoir inlet and connected to the float, a stop on said valve stem and movable into and from the reservoir inlet to limit downward movement of the float, said stop having a plurality of peripheral channels or grooves permitting passage of oil to the reservoir even when the float is in its lowermost position, a conduit connecting the reservoir outlet with the crank case, and automatically acting means for preventing flow of oil between the reservoir and crank case, in either direction, when the crank case is in an inclined position.

In testimony whereof I have hereunto set my hand.

CHARLES ROCKWELL.